Dec. 16, 1924.
R. A. BOLZE ET AL
1,519,234
HEATER CONTROL
Original Filed Oct. 2. 1919    2 Sheets-Sheet 1
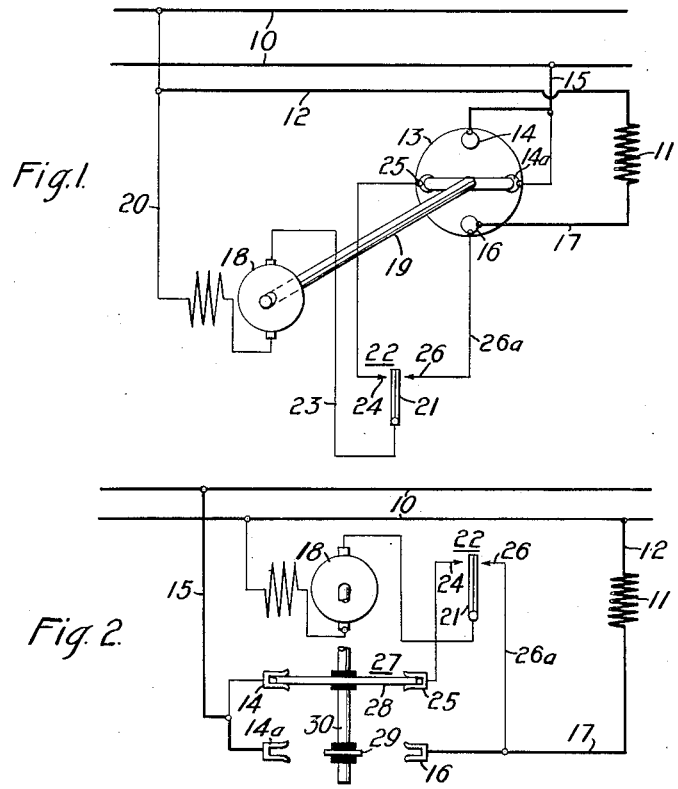
WITNESSES:
H. J. Shelhamer
N. M. Biebel
INVENTORS
Earl W. Denman &
Rudolph A. Bolze
BY
Wesley G. Carr
ATTORNEY Dec. 16, 1924.

R. A. BOLZE ET AL 1,519,234

HEATER CONTROL

Original Filed Oct. 2, 1919    2 Sheets-Sheet 2

WITNESSES:
H. J. Shelhamer
N. M. Biebel.

INVENTORS
Earl W. Denman &
Rudolph A. Bolze
BY
Wesley G. Carr
ATTORNEY

Patented Dec. 16, 1924.

1,519,234

UNITED STATES PATENT OFFICE.

RUDOLPH A. BOLZE, OF PLEASANTVILLE, NEW YORK, AND EARL W. DENMAN, OF WILKINSBURG, PENNSYLVANIA, ASSIGNORS TO WESTINGHOUSE ELECTRIC AND MANUFACTURING COMPANY, A CORPORATION OF PENNSYLVANIA.

HEATER CONTROL.

Application filed October 2, 1919, Serial No. 328,033. Renewed January 30, 1923.

*To all whom it may concern:*

Be it known that we, RUDOLPH A. BOLZE, a citizen of the United States, and a resident of Pleasantville, in the county of Westchester and State of New York, and EARL W. DENMAN, a citizen of the United States, and a resident of Wilkinsburg, in the county of Allegheny and State of Pennsylvania, have invented a new and useful Improvement in Heater Control, of which the following is a specification.

Our invention relates to electrical heating devices and particularly to systems employing a thermostatically-operated device for controlling the temperature of an electric heater.

One object of our invention is to provide a simple and compact device for controlling the temperature of an electrically heated device.

Another object of our invention is to provide a simple control circuit for the above device.

A further object of our invention is to provide a system of the above-designated type in which the current through the closed contacts of the thermostat shall be interrupted before the said contacts become disengaged, in order to preclude interrupting the current at the thermostat contacts.

In practicing our invention, we provide a snap switch of the ordinary commercial type, with a motor to operate the same, and a double-contact thermostat to control the operation of the motor. The thermostat is so connected, with regard to the switch, that the current through it is interrupted by the switch.

In the two sheets of drawings, Figure 1 is a schematic view of a device and the diagram therefor embodying our invention, using a standard three-point snap switch.

Fig. 2 is a schematic view of a modification of the device embodying our invention, using a modified double-pole snap switch, with a motor to operate the same.

Figure 3:
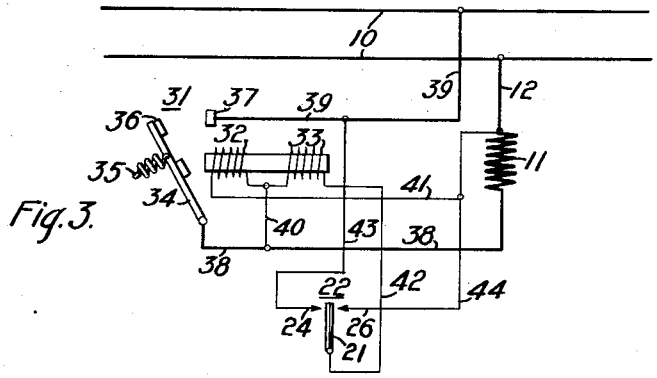
Fig. 3 is a schematic view of another modification of the device embodying our invention, using a contactor type of switch.

Referring particularly to Fig. 1, a supply circuit 10 is connected to a current-consuming device, here shown as a resistor 11, through a conductor 12, and controlled by a three-point snap switch 13. Two contact terminals 14 and 14a of the switch 13 are connected to one conductor of the supply circuit 10 by means of a conductor 15. The other terminal of the resistor 11 is connected to a terminal 16 of the switch 13 by means of a conductor 17. A motor 18 actuates the switch 13 through a suitable shaft 19. One terminal of the motor 18 is connected to one conductor of the supply circuit 10 by means of a conductor 20, and the other terminal of the motor 18 is connected to a bi-metallic strip 21 of a double-contact thermostat 22 through a conductor 23. A "low" contact 24 of the thermostat 22 is connected to a terminal 25 of the snap switch 13. A "high" contact 26 of the thermostat 22 is connected to the terminal 16 of the switch 12 by means of a conductor 26a.

Referring to the modification of our device shown in Fig. 2, the motor 18 operates a switch 27 having two switch blades 28 and 29 insulated from each other and mounted on an operating shaft 30 to which the shaft of the motor 18 is suitably connected. The sets of contact jaws 14 and 25 and 14a and 16 may be located in the same angular position in the switch box, in which case the two switch blades 28 and 29 are angularly displaced from each other by 90°, or the two sets of contact jaws may be similarly angularly displaced, in which case the two blades 28 and 29 are mounted in the same angular position on the shaft 30.

Referring to Fig. 3, a magnetic contactor 31, having two energizing coils or windings 32 and 33, is used to control the circuit through the resistor 11. The movable contact arm 34 is normally held open by a spring 35 and has a contact terminal 36 mounted thereon which co-operates with a stationary contact terminal 37 to close the circuit through the resistor 11. The arm 34 is connected to the resistor 11 by means of a conductor 38. The contact terminal 37 is connected to one conductor of the supply circuit 10 by means of a conductor 39. The inner end of the coil 32 is connected to the inner end of the coil 33 and also to conductor 38 by means of a conductor 40. The outer end of coil 32 is connected to one conductor of the supply circuit 10 by means of a conductor 41, and the outer end of a coil 33 is connected to the bi-metallic strip 21 by means of a conductor 42. The "low" contact terminal 24 of the thermostat 22 is connected to the conductor 39 by means of a conductor 43, and the "high" contact terminal 26 is connected, by means of conductor 44, to the same conductor of the supply circuit 10 to which conductor 41 is connected.

Figure 4:
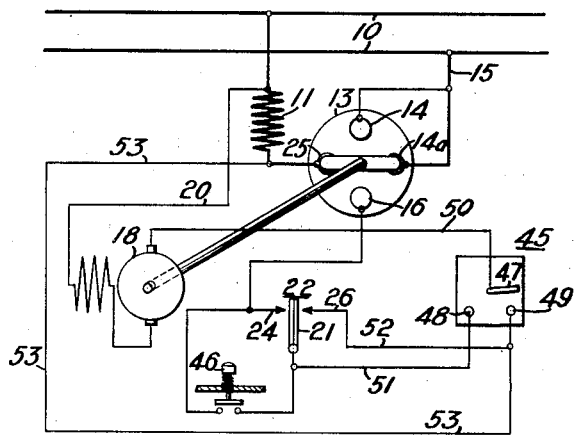
Fig. 4 is a schematic view of one of the modifications of the device embodying our invention, used in connection with a time switch.
Figure 5:
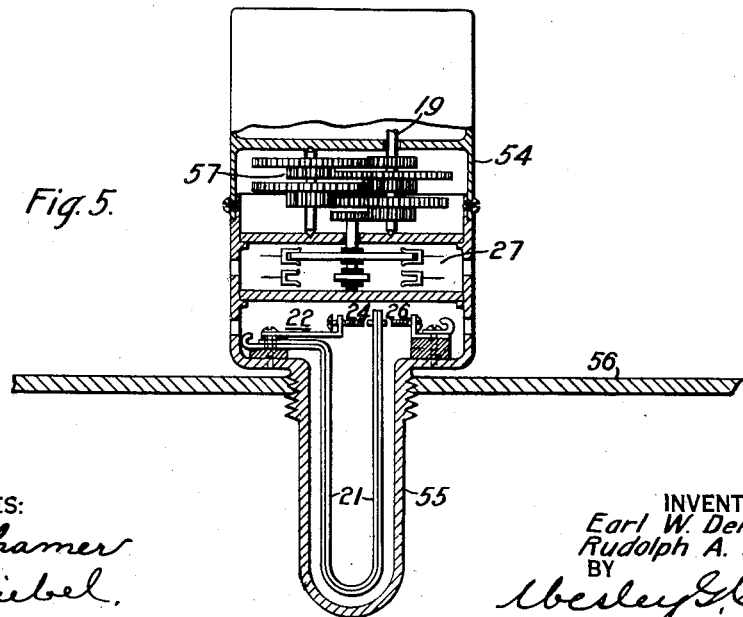

In Fig. 4 is shown the combination of the snap switch 13 with a time switch 45 and a push button 46 to control the flow of current through the resistor 11. The time switch 45 comprises a rotatable arm 47 operated by a suitable time mechanism (not shown) and an adjustable "on" contact terminal 48 and an adjustable "off" contact terminal 49. The time switch mechanism is of such type that, after the rotatable arm 47 has engaged the "on" contact terminal 48, the circuit therethrough remains closed until the arm 47 engages the "off" contact terminal 49, and vice versa. The arm 47 is connected to one terminal of the motor 18 by means of a conductor 50. The contact terminal 48 is connected to the bi-metallic strip 21 by means of a conductor 51. The contact terminal 49 is connected to the "high" contact terminal 26 of the thermostat 22 by means of a conductor 52 and is also connected to contact terminal 25 of the switch 13 by means of conductor 53. The push-button 46 is connected in shunt to the "low" contact 24 and to the bi-metallic strip 21 of the thermostat 22.

Referring to Fig. 1, in the position of the switch 13, as there shown, the resistor 11 is de-energized, and the device is ready to operate as soon the bi-metallic strip 21 engages the "low" contact terminal 24. The following circuit is then established: from one conductor of circuit 10, through conductor 15, to contact terminal 14a, through the switch blade to contact terminal 25 and to contact terminal 24, through the bi-metallic strip 21, conductor 23, motor 18 and conductor 20, to the other conductor of circuit 10. This causes the motor 18 to operate, and the switch blade is so moved as to connect contact terminals 14 and 16 together. The disengagement of the switch blade from contact terminals 14a and 25 interrupts the circuit through the thermostat 22 and the motor 18 and, hence, the motor ceases to operate immediately after the switch blade leaves its old position. A circuit is thereby established though the resistor 11 as follows: from one conductor of circuit 10, through conductor 15, to contact terminal 14, through the switch blade to contact terminal 16, through conductor 17, resistor 11 and conductor 12 to the other conductor of supply circuit 10. The temperature of the resistor 11 and of the surrounding medium will be raised and if the temperature becomes so high that the free end of the bi-metallic strip 21 engages the contact terminal 26, a circuit will be established as follows: from one conductor of circuit 10, through conductor 15, to contact terminal 14, through the switch blade to contact terminal 16, through conductor 26a to the contact terminal 26, through the bi-metallic strip 21, conductor 23, motor 18 and conductor 20, to the other conductor of supply circuit 10. The motor 18 will, therefore, operate the switch to de-energize the resistor 11. The temperature of the resistor and of the medium being heated, decreases until the bi-metallic strip 21 engages contact terminal 24, causing the motor to operate as described above. It will be noticed that the disengagement of the strip 21 from either contact terminal 24 or 26 does not interrupt any current as the current through the thermostat is interrupted by the operation of the switch 13.

The operation of the device shown in Fig. 2 is essentially the same as that shown in Fig. 1, and it is believed that a detailed description of this modification is, therefore, unnecessary.

In Fig. 3, the switch 31 is shown as having interrupted the circuit through the resistor 11, and the bi-metallic strip 21 as not being in engagement with either of the two co-operating terminals. If, now, the bi-metallic strip 21 engages contact terminal 24, the following control circuit is established: from one conductor of circuit 10 through conductors 39 and 43, contact terminal 24, bi-metallic strip 21, conductor 42, coil 33, conductors 40 and 38, resistor 11 and conductor 12, to the other conductor of circuit 10. The coil 33, will, therefore, be energized and will attract the switch arm 34 to cause the contact 36 to engage the stationary contact 37 and to establish the following circuit: from one conductor of circuit 10, through the conductor 39, contact terminals 37 and 36, switch arm 34, conductor 38, resistor 11 and conductor 12, to the other conductor of circuit 10. At the same time, coil 33 is de-energized as both of its terminals are connected to the same conductor of supply circuit 10 by the closing of the switch 34, a circuit being established as follows: from one conductor of the supply circuit 10, through conductor 39, contact terminals 37 and 36, switch arm 34 and conductor 40, to one terinal of coil 33. The other terminal of coil 33 is connected to the same conductor of supply circuit 10 through the following circuit: through conductor 42, bi-metallic strip 21, contact terminal 24 and conductors 43 and 39. However, coil 32 is simultaneously energized by the following circuit: from one conductor of circuit 10, through conductor 39, contact terminals 37 and 36, switch arm 34, conductors 38 and 40, coil 32 and conductors 41 and 12, to the other conductor of supply circuit 10. The switch arm 34 is, therefore, held in its closed position until the coils 32 and 33 are both energized by the engagement of the bi-metallic strip 21 with the "high" contact terminal 26; coil 32 being energized through the following circuit: from one conductor of circuit 10, through conductor 39, contact terminals 37 and 36, arm 34 and conductors 41 and 12, to the other conductor of the supply circuit 10, while coil 33 is energized from conductor 40 and then through conductor 42, bi-metallic strip 21, contact terminal 26 and conductors 44 and 12. This so energizes both coils 32 and 33 that their magnetic effects oppose each other, and the spring 35 causes the movable contact arm 34 to take its open position and de-energize the resistor 11. Upon cooling down to a predetermined temperature, the bi-metallic strip 21 engages the "low" contact terminal 24, and the switch operates again as described above.

In the diagram shown in Fig. 4. the switch 13 is shown as closing a circuit through the resistor 11, and the bi-metallic strip 21 as being disengaged from both the "low" and the "high" contact terminals 24 and 26. The rotatable arm 47 of the time switch may be assumed to move in a clockwise direction so that the circuit is still closed through the "on" contact terminal 48. In case the temperature rises beyond a predetermined value before the arm 47 engages the "off" contact terminal 49, the bi-metallic strip 21 engages the "high" contact terminal 26 and establishes the following circuit: from one conductor of circuit 10, through conductor 20, the motor 18, conductor 50 and arm 47 and the time-switch mechanism, to contact terminal 48, through conductor 51, bi-metallic strip 21, contact terminal 26, conductors 52 and 53, the switch contact terminals 25 and 14a and the conductor 15, to the other conductor of circuit 10. The motor 18 will operate to actuate the switch 13 which is so moved as to connect the contact terminals 14 and 16, thereby de-energizing the resistor 11. If, now, the temperature falls so as to cause the strip 21 to engage the contact terminal 24, the circuit will be closed through the motor 18 as follows: from one conductor of circuit 10, through conductor 20, motor 18, conductor 50 and the mechanism of time switch 45, to contact terminal 48, through conductor 51, bi-metallic strip 21 and contact terminal 24, to contact terminal 16 of the switch 13, through the switch blade to the contact terminal 14 and through conductor 15 to the other conductor of supply circuit 10. This causes the motor 18 to operate and to actuate the switch, thereby again closing the circuit through the resistor 11.

If we assume that the position of the various parts is as shown in Fig. 4, and that the arm 47 of the time switch 45 engages the "off" contact terminal 49 before the temperature has risen sufficiently to cause the thermostat 22 to operate as described above, the following circuit will be established: from one conductor of circuit 10, through conductor 20, motor 18, conductor 50, arm 47, contact terminal 49, conductor 53, contact terminal 25 and the switch blade, to contact terminal 14a and, through conductor 15, to the other conductor of circuit 10. This causes the motor 18 to operate and to actuate the switch 13 to interrupt the circuit through the resistor 11. If the position of the adjustable "on" contact terminal 48 is such that the rotatable arm 47 may engage it before the bi-metallic strip 21 engages the "low" contact 24, the circuit through the motor 18 will not be closed, and the push button 46 is provided to shunt the thermostat contact terminal 24 and the bi-metallic strip 21 and enable a circuit to be established through the motor 18 to cause it to operate as described above.

It will be noted that the device and the diagram shown in Fig. 4 give complete automatic control, as regards both temperature range and the time of closing and of interrupting the circuit through the current-consuming device and that both the mechanism and the diagram are relatively simple. It will also be noted that, in all cases, the bi-metallic strip of the thermostat closes the control circuit but does not interrupt it, thereby preventing any destructive arcing and burning of the thermostat contacts.

Various modifications and changes may be made without departing from the spirit and scope of our invention, and we desire that only such limitations shall be placed thereon as are imposed by the prior art or are specifically set forth in the appended claims.

We claim as our invention:

1. In an electrical heating circuit, the combination with an energy-absorbing device and a supply circuit therefor, of a circuit interrupter therebetween, rotatable electrical means for closing and for opening the interrupter, and thermostatic means for controlling said means.

2. In an electrical heating circuit, the combination with an energy-absorbing device and a supply circuit therefor, of a control switch, single operating means for closing and for opening the switch, and thermal means for controlling said operating means, the circuit through said thermal control means being interrupted by said control switch.

3. In an electrical heating circuit, the combination with an energy-absorbing device and a supply circuit therefor, of a snap switch, a motor to operate the same, to connect the device to, and disconnect the device from, the circuit, and a double-contact thermostat to control the motor, the thermostat being so connected that its circuit will be interrupted by the snap switch.

4. In an electrical heating circuit, the combination with an energy-absorbing device and a supply circuit therefor, of a three-point snap switch, a motor to operate said switch to close and to open the circuit, and a double-contact thermostat to control the motor, the thermostat being so connected that each operation of the switch will interrupt the circuit through the thermostat.

5. In an electrical heating circuit, the combination with an energy-absorbing device and a supply circuit therefor, of a switch having a closed position in which the energy-absorbing device is energized by the supply circuit, a single means for operating said switch to its closed and to its open position, and thermostatic means for controlling said operating means.

6. In an electrical heating circuit, the combination with an energy-absorbing device and a supply circuit therefor, of a snap switch to control the connections of the energy-absorbing device to the supply circuit, a motor to operate said switch, to its connecting and its disconnecting positions, and a double-contact thermostat for controlling said motor, said switch serving to interrupt the thermostat circuit.

7. In an electrical heating circuit, the combination with a supply circuit, and an energy-consuming device, of a switch provided with a set of contacts, in circuit with said energy-consuming device for controlling the supply of current thereto, means for controlling the action of said switch to effect the engagement and the disengagement of the contacts comprising a thermostat and a single switch-operating mechanism connected in circuit with said thermostat.

8. In an electrical heating circuit, the combination with a supply circuit and an energy-consuming device, of a switch for controlling the supply of current to said current-consuming device, and a thermostatically controlled switch-operating mechanism for closing and for opening the switch said switch having one set of contacts for controlling the supply of current to the energy-consuming device, and a second set of co-operating contacts, for controlling the circuit through said thermostat.

9. In an electrical heating circuit, the combination with a supply circuit and an energy-consuming device, of a snap switch for controlling the supply of current to said energy-consuming device, a switch-operating mechanism for closing and for opening the switch and a temperature-responsive element for controlling the action of said switch-operating mechanism, the snap switch being so connected that the supply of current to the energy-consuming device and the circuit through the temperature-responsive element will be simultaneously interrupted immediately after the movable contact of the temperature-responsive device engages its co-operating contact.

In testimony whereof, I have hereunto subscribed my name this 6th day of Sept., 1919.

RUDOLPH A. BOLZE.

In testimony whereof, I have hereunto subscribed my name this 25th day of Aug., 1919.

EARL W. DENMAN.